United States Patent
Heidemann et al.

(10) Patent No.: US 6,554,525 B1
(45) Date of Patent: Apr. 29, 2003

(54) RADIAL BALL JOINT

(75) Inventors: Manfred Heidemann, Belm-Vehrte (DE); Guido Schulte, Bersenbrück (DE); Martin Rechtien, Neuenkirchen-Vörden (DE); Olaf Abels, Belm (DE); Frank Berstermann, Hagan a. TW (DE); Rainer Ungruh, Hörstel (DE)

(73) Assignee: ZF Lemförder Metallwaren AG (DE)

( * ) Notice: Subject to any disclaimer, the term of this patent is extended or adjusted under 35 U.S.C. 154(b) by 7 days.

(21) Appl. No.: 09/786,447

(22) PCT Filed: Jun. 21, 2000

(86) PCT No.: PCT/DE00/01956

§ 371 (c)(1), (2), (4) Date: Apr. 11, 2000

(87) PCT Pub. No.: WO01/02741

PCT Pub. Date: Jan. 11, 2001

(30) Foreign Application Priority Data

Jul. 2, 1999 (DE) .................................. 199 30 445

(51) Int. Cl.⁷ ................................................ F16C 11/06
(52) U.S. Cl. .................................. 403/140; 280/93.511
(58) Field of Search .......................... 403/140, 135, 403/138, 127, 133; 280/93.511

(56) References Cited

U.S. PATENT DOCUMENTS

| | | | |
|---|---|---|---|
| 3,154,333 A | | 10/1964 | Townsend |
| 3,574,369 A | * | 4/1971 | Andrew .................... 403/132 |
| 4,076,344 A | * | 2/1978 | Gaines et al. ............. 384/213 |
| 4,220,418 A | * | 9/1980 | Kondo et al. .............. 403/76 |
| 4,231,673 A | | 11/1980 | Satoh et al. |
| 4,564,307 A | * | 1/1986 | Ito ........................... 403/140 |
| 4,971,473 A | * | 11/1990 | Schafer et al. ............ 403/140 |
| 4,995,754 A | * | 2/1991 | Ishii ......................... 403/132 |
| 5,697,723 A | * | 12/1997 | Wood ....................... 403/135 |
| 5,772,352 A | * | 6/1998 | Fukumoto et al. ........ 403/144 |
| 5,795,092 A | * | 8/1998 | Jaworski et al. .......... 403/56 |

FOREIGN PATENT DOCUMENTS

| | | |
|---|---|---|
| DE | 1098381 | 1/1961 |
| DE | 4209835 A1 | 10/1992 |
| DE | 4305994 A1 | 9/1993 |
| DE | 4211897 A1 | 10/1993 |
| DE | 19755284 A1 | 6/1999 |
| EP | 0779442 A1 | 6/1997 |
| GB | 1233906 | 6/1971 |
| GB | 1417407 | 12/1975 |
| GB | 2212211 A | 7/1989 |

* cited by examiner

Primary Examiner—Robert J. Sandy
(74) Attorney, Agent, or Firm—McGlew and Tuttle, P.C.

(57) ABSTRACT

A radial ball-and-socket joint is provided with a housing. A bearing shell (2) in the housing rotatably and tiltably accommodates a joint ball (4). The joint ball is part of a ball pivot (3). The ball pivot also has a shaft (5), which projects through a outlet opening (6) of the housing (1). The housing is closed with a cover (7) on the side opposite the outlet opening (6). The bearing shell (2), accommodated in the housing in a positioned manner, has an axially extending continuous slot (8). The cover (7), arranged between the cover and the bearing shell, has a geometry (9) impressed into a damping element (11) on its inner side facing the bearing shell. As a result of the construction the damping element (11) and the bearing shell are fixed in the housing (1).

20 Claims, 4 Drawing Sheets

RADIAL BALL JOINT

FIELD OF THE INVENTION

The present invention pertains to a radial ball-and-socket joint with a housing, in which a bearing shell rotatably and tiltably accommodates a joint ball. The joint ball is part of a ball pivot. The ball pivot also has a shaft, which projects through an outlet opening of the housing. The housing is closed with a cover on the side opposite the outlet opening.

BACKGROUND OF THE INVENTION

Radial ball-and-socket joints are loaded predominantly in the radial direction and are used mainly for wheel suspensions in motor vehicles. Such a radial ball-and-socket joint known from the state of the art comprises a housing in which a bearing shell rotatably and tiltably receives a joint ball of a ball pivot. The ball pivot also has a shaft, which projects from the housing through an outlet opening. The housing is closed with a cover on the side opposite the outlet opening.

A ball-and-socket joint in which the bearing shell is traversed by a slot extending at right angles to the circumferential direction has been known from DE 42 11 897 A1.

Furthermore, DE 43 05 994 A1 discloses a bearing shell on the housing-side contact surfaces of which ribs are made in one piece, which bring about a specific mounting characteristic of the joint ball of the ball pivot.

One problem that keeps arising especially in radially loaded ball-and-socket joints is, on the one hand, that a possibility of mounting the joint ball is to be provided which sufficiently meets the loads that occur. The contact surface between the joint ball and the inner surface of the bearing shell shall not possibly have any interruptions for this. On the other hand, the lowest possible friction is required between the bearing shell and the joint ball. However, it would be necessary for this to possibly permit only small contact surfaces between the joint ball and the inner surface of the bearing shell. This apparent contradiction cannot be sufficiently solved with the prior-art ball-and-socket joint designs.

Moreover, it is disadvantageous in prior-art designs that the bearing shell can rotate automatically within the housing. As a result, optimal positioning of the bearing shell, which is performed at the time of the first assembly with respect to the loads to be expected, is no longer given, and the ball joint is subject to more rapid wear or it no longer meets the necessary requirements.

SUMMARY AND OBJECTS OF THE INVENTION

The basic technical object of the present invention is to provide a radial ball-and-socket joint that can handle the loads occurring mainly in the radial direction and has only a slight friction between the bearing shell and the joint ball of the ball pivot. At the same time, automatic rotation of the bearing shell in the housing shall be prevented from occurring.

According to the invention, a radial ball-and-socket joint is provided with a housing, in which a bearing shell rotatably and tiltably accommodates a joint ball. The joint ball is part of a ball pivot. The ball pivot also has a shaft, which projects through an outlet opening of the housing. The housing is closed with a cover on a side opposite the outlet opening. The bearing shell, accommodated in the housing in a positioned manner, has an axially extending continuous slot and the cover has a geometry impressed into a damping element arranged between the cover and the bearing shell on its inner side facing the bearing shell. As a result of this the damping element and the bearing shell are fixed in the housing.

Thus, the radial ball-and-socket joint according to the present invention has a bearing shell with a continuous slot extending axially relative to the central axis of the bearing shell.

In addition, a geometry be provided in the cover closing the housing on the side of the cover facing the bearing shell or made integrally with the cover. This geometry is impressed into a damping element present between the surface of the bearing shell and the underside of the cover. This geometry may be, e.g., a wave-shaped, cam-shaped or sawtooth-like contour.

During the assembly of the joint, the bearing shell is first pulled over the joint ball and is subsequently inserted into the housing in a predetermined fitting position. This fitting position can be determined by means of simple markings provided on the housing.

To make it possible to close the radial ball-and-socket joint with the cover, the cover is placed on the closure-side opening, so that it is impressed with its above-mentioned geometry into the damping element, as a result of which a gentle axial pretension is applied via the damping element to the bearing shell, which ultimately represents a very simple means of securing the bearing shell and the damping element against rotation.

The positioned fitting position of the bearing shell is of particular significance for preventing the slot from being located in the principal direction of load of the radial ball-and-socket joint. The fitting position can be defined highly accurately because there is only one principal direction of load, which is arranged opposite the slot, in ball-and-socket joints in according to the present invention.

The friction within the joint was also reduced substantially by the design of a radial ball-and-socket joint according to the present invention because the bearing shell can be placed on the joint ball of the ball pivot under an extremely weak centripetal pressure as a consequence of the axially continuously arranged slot in the bearing shell.

A gentle axial pretensioning force is applied to the bearing shell due to the cover closing the housing, where a damping element may also be provided on the inner side of the cover. The contact surfaces between the joint ball and the inner surface of the bearing shell are reduced by such a design, as is the pressing force of the bearing shell against the joint ball. The joint is subject, on the whole, to very little wear because there is hardly any friction between the joint ball and the bearing shell surface accommodating it.

Furthermore, compensation of manufacturing tolerances of the individual components and of the dimensional tolerances occurring in the joint due to temperature differences is achieved by means of a ball-and-socket joint according to the present invention, and so is a compensation of wear-related tolerances which become established over the course of time in every joint and frequently lead to it becoming unfit for use.

According to another embodiment of the present invention, the bearing shell is provided with circumferentially arranged ribs on the side facing the cover. Besides improving the securing of the bearing shell against rotation, these ribs also make it possible to obtain a freely selectable, axial damping characteristic of the bearing shell as a function of the geometry of the ribs.

To avoid a spontaneous movement of the damping element and/or the bearing shell within the radial ball-andsocket joint, it is possible according to the present invention, on the one hand, to provide a contact surface on the inside of the cover for the damping element, which has a geometric profile which is impressed into the damping element after the closing of the housing, or to make the cover and the damping element in one piece.

In the case of a one-piece design, the damping element may be vulcanized as a rubber ring directly on the cover or be subsequently bonded to the cover or be fastened to it in another way.

The rubber ring forming the damping element may have various cross sections, e.g., in a round, rectangular or square cross section in such a solution.

To meet the requirement in terms of low static friction and low moment of friction of the bearing shell-joint ball pair, it is, furthermore, proposed that the spherical inner bearing surface of the bearing shell be provided with a circumferential recess in the equatorial area. Moreover, the inner bearing surface of the bearing shell may have a plurality of grease pockets in the form of simple geometric recesses. The contact areas between the bearing shell and the joint ball are thus reduced to a minimum in terms of both their number and their area. Recesses of various types and geometry as well as arrangement may, of course, be provided within the spherical inner bearing surface of the bearing shell.

However, the recesses always have a depth that is so small that when a radially directed load is applied to the joint ball, the joint ball will immediately come into contact with the bottom of the recess and full loading of the bearing is thus achieved in a short time.

As a result, it was possible to achieve an increase in the loadability of the joints according to the present invention while reducing the friction at the same time.

The features of the present invention, which were mentioned above and will be explained below, may, of course, be used not only in the particular combination described but also in other combinations, additionally or alone, without going beyond the scope of the present invention.

A preferred embodiment of a radial ball-and-socket joint according to the present invention will be explained in greater detail below with reference to the corresponding drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
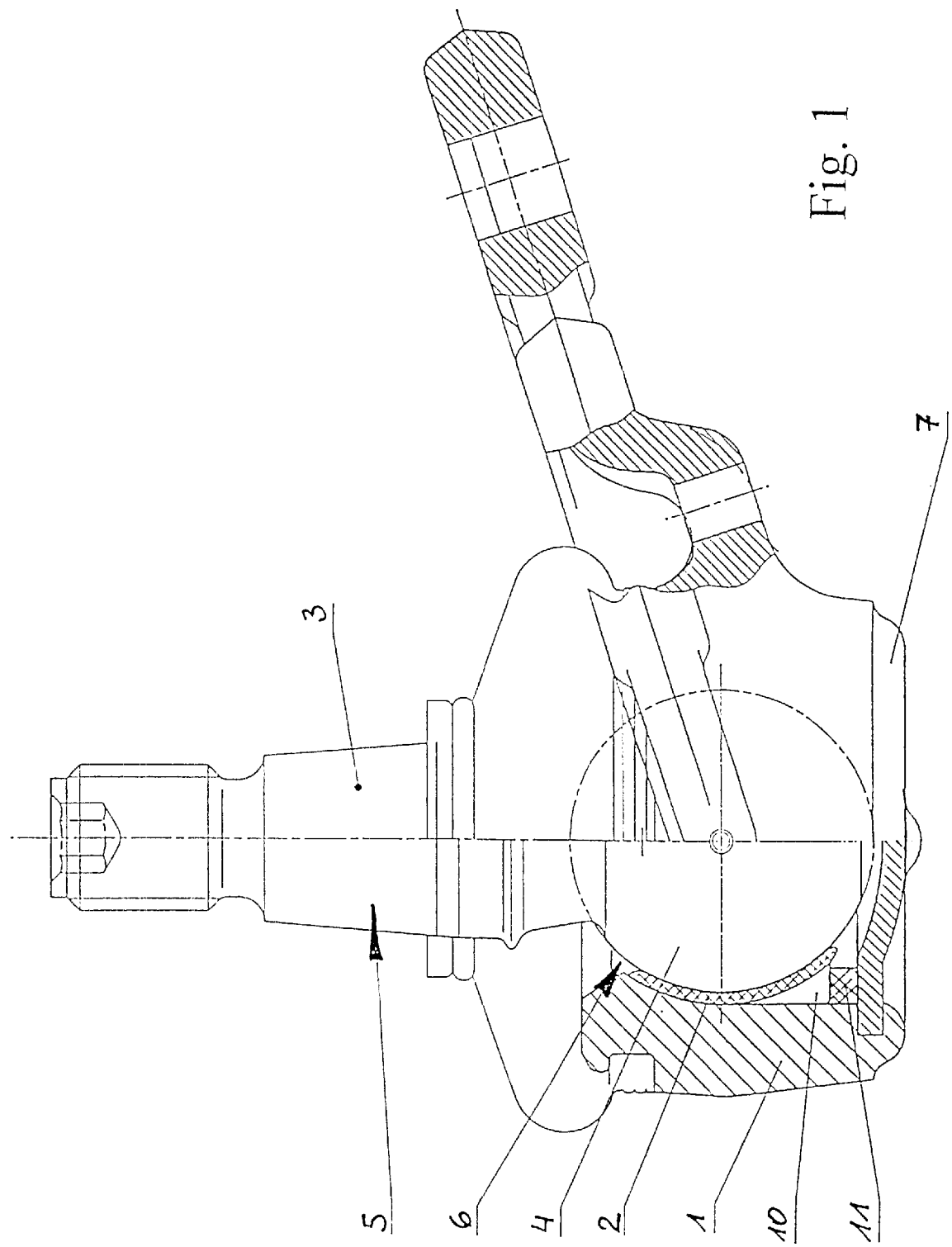
FIG. 1 is a partial sectional view of a radial ball-and-socket joint.

Referring to the drawings in particular, the radial ball-and-socket joint shown in the figures has a housing 1, in which a bearing shell 2 is accommodated. The joint ball 4 of a ball pivot 3 is accommodated rotatably and tiltably within the spherical bearing shell inner surface. The shaft 5 made in one piece with the ball pivot 3 exits on one side through an outlet opening 6 of the housing 1. On the side of the housing 1 opposite the outlet side, the housing is closed by means of a cover 7. The bearing shell 2 has an axially extending, continuous slot 8 according to the present invention and is secured against spontaneous rotation within the housing 1 indirectly by a damping element 11 arranged between the cover and the bearing shell. The geometry 9 present in the cover 7 in the form of a wave-shaped contour is impressed into the surface of the damping element 11.

Figure 3:
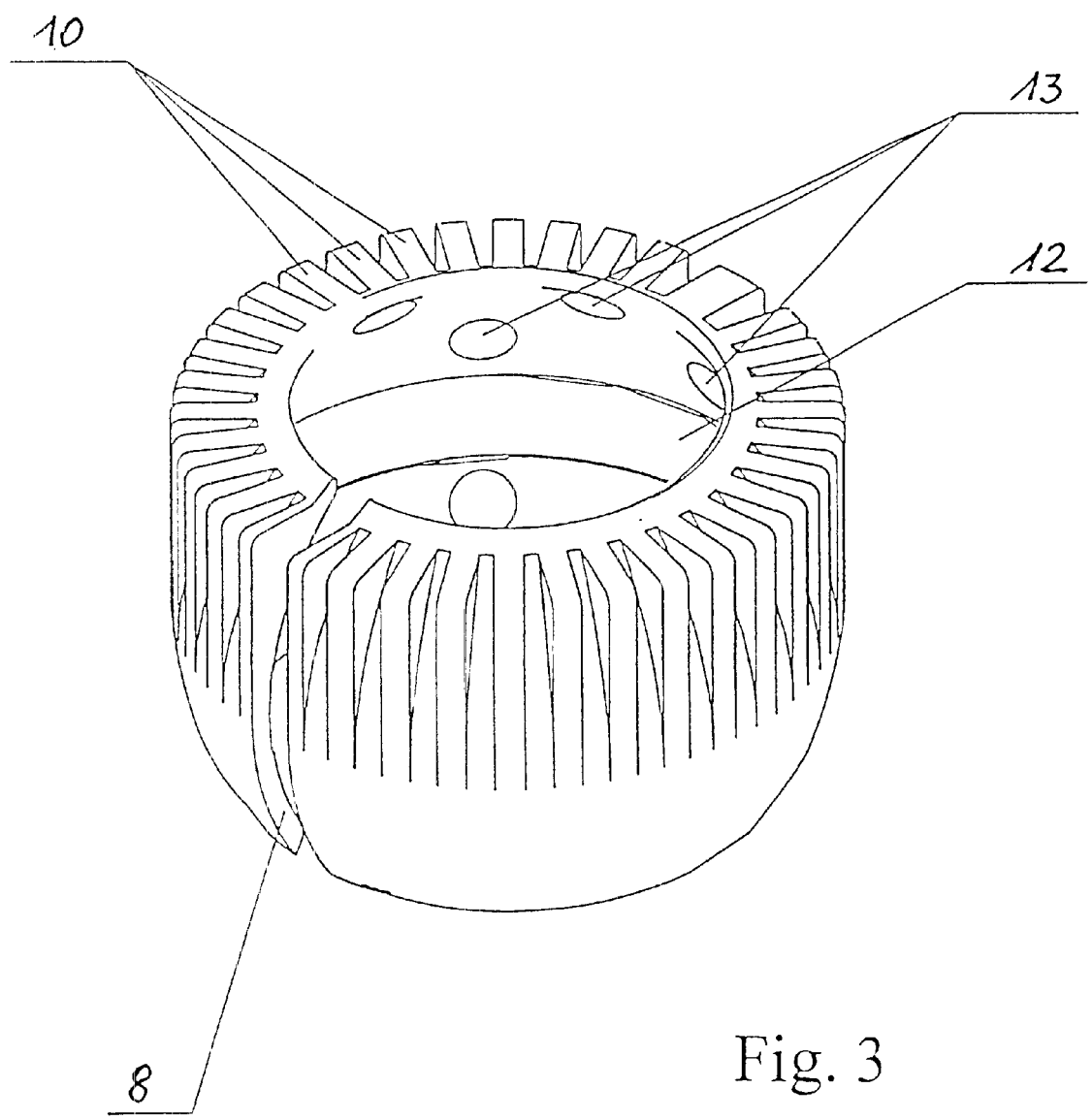
FIG. 3 is a perspective view of a bearing shell of a radial ball-and-socket joint according to the present invention.

As is apparent especially from the view in FIG. 3, the bearing shell 2 has web-shaped ribs 10 arranged distributed over the circumference in its area facing the cover 7. These ribs guarantee a freely selectable axial and/or radial elasticity of the bearing shell 2. Furthermore, recesses 13 forming grease pockets are provided on the spherical inner surface of the bearing shell to reduce the friction of the joint ball-bearing shell pair. In addition, a circumferential recess 12 is present in the equatorial area of the inner spherical bearing surface of the bearing shell 2.

The cover 7 is fastened to the ball-and-socket joint housing 1 by a material deformation operation, e.g., by beading or rolling of the rolling edge 14 of the housing.

Figure 2:
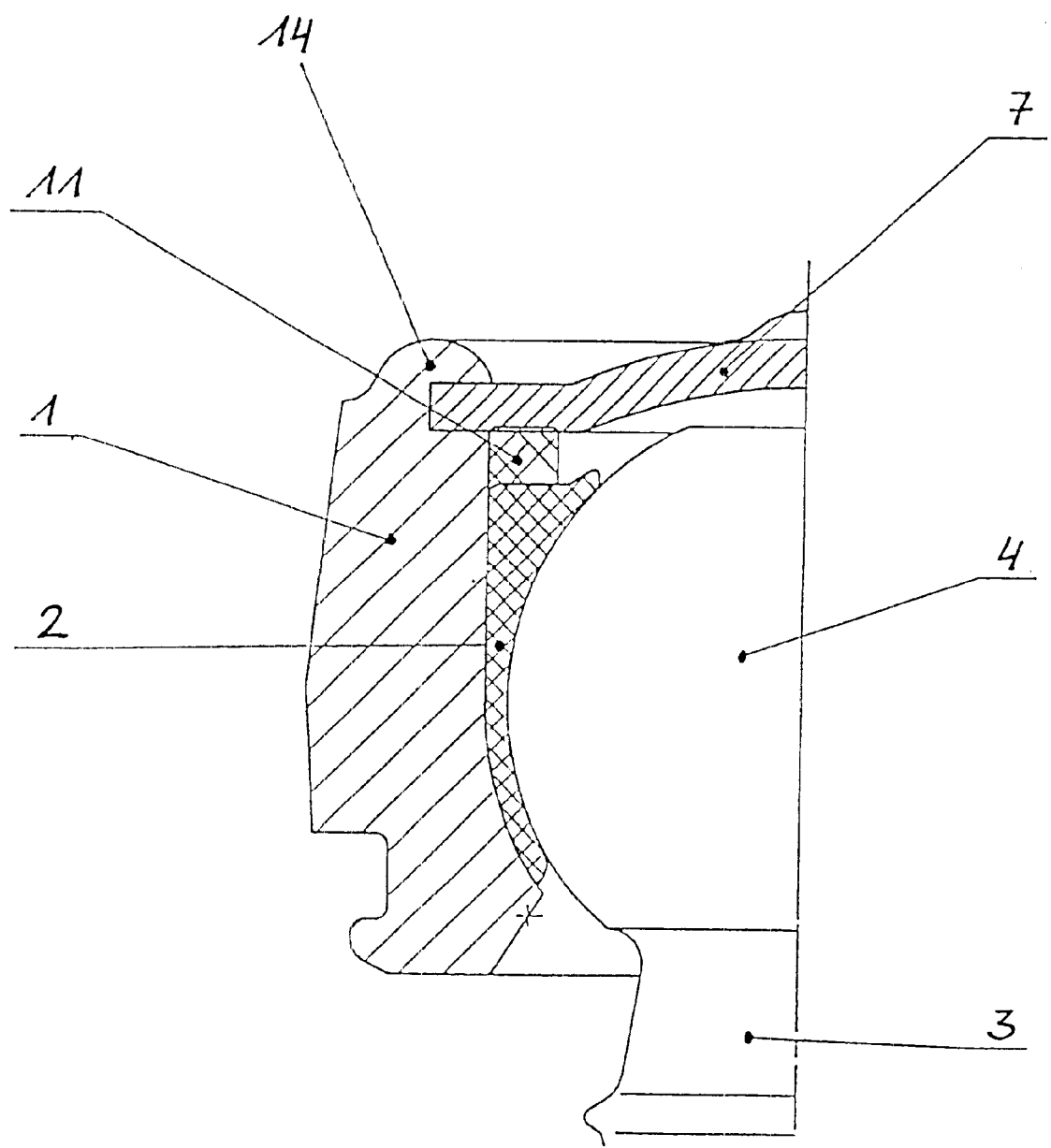
FIG. 2 is an enlarged sectional view of a radial ball-and-socket joint according to the present invention.

As is apparent from the views in FIGS. 1 and 2, the bearing shell 2 and the housing 1 receiving the bearing shell also have an outer, spherical bearing surface on the side on which the pivot exits. The bearing shell 2 is thus supported in the housing 1 on this spherical bearing surface.

Figures 4A, 4B:
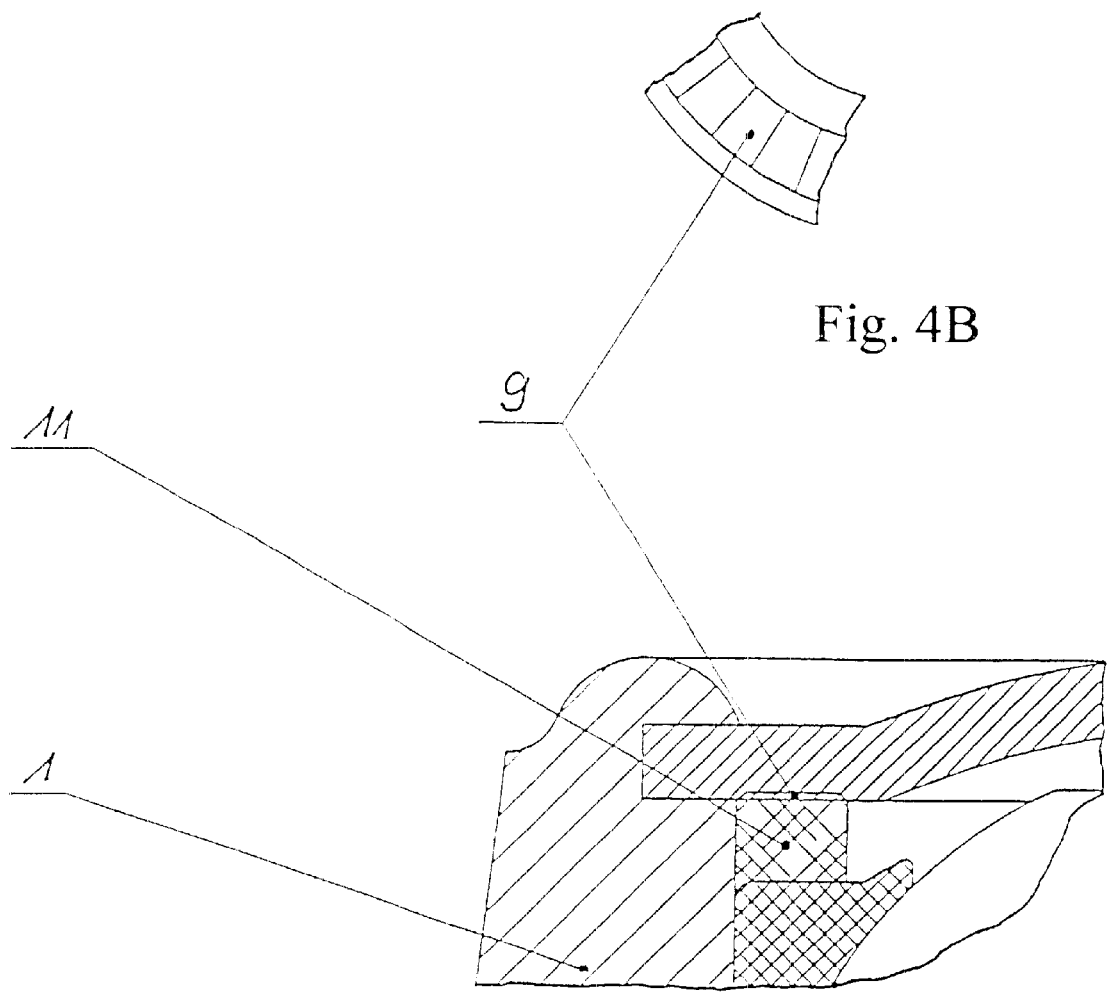
FIG. 4A is an enlarged sectional detail view of the cover-side part of a ball-and-socket joint.
FIG. 4B is an enlarged broken away top detail view of the cover-side part of a ball-and-socket joint.

FIG. 4 shows once again two enlarged details of the closure of the joint in two views in a partial view. A wave-shaped geometry 9 (see upper part of FIG. 4), which is impressed into the damping element 11 during the closing of the housing, is provided in the underside of the cover 7. Due to the ribs 10 made in one piece with its top side, the bearing shell also forms a positive-locking connection with the damping element 11, so that the bearing shell 2 is fixed in the housing 1 as a result.

The recesses 12 and 13 on the inner bearing surface of the bearing shell 2 are not shown in FIGS. 1 and 2 because of the size ratios. The pretensioning force applied to the bearing shell in the axial direction via the cover and the damping element 11 made in one piece therewith guarantees that the bearing shell 2 is permanently in contact with the joint ball 4. Rattling of the ball-and-socket joint is thus ruled out.

Yet, a low-friction ball-and-socket joint which has not been known before from the state of the art in this unique combination is made available as a consequence of the overall design and the combination of features according to the present invention.

While a specific embodiment of the invention has been shown and described in detail to illustrate the application of the principles of the invention, it will be understood that the invention may be embodied otherwise without departing from such principles.

What is claimed is:

1. A radial ball-and-socket joint comprising:
   a housing having an outlet opening;
   a one piece bearing shell disposed in said housing, said bearing shell being accomodated in said housing in a positioned manner, said bearing shell having edges defining an axially extending continuous slot, said edges being circumferentially spaced from each other;

a joint ball and ball pivot, said joint ball being rotatably and tiltably accommodated in said bearing shell, said ball pivot having a shaft, which projects through said outlet opening of said housing, said bearing shell enclosing said joint ball;

a cover closing said housing on a side of said housing opposite said outlet opening;

a damping eleanent arranged between said cover and said bearing shell on an inner side of said cover facing said bearing shell, said cover having a geometry impressed into said damping element to fix said damping element and said bear shell in said housing.

2. A radial ball-and-socket joint in accordance with claim 1, wherein said bearing shell has ribs arranged circumferentially on a side facing said cover, said cover, said damping element and said bearing shell interacting to rotationally fix said bearing shell relative to said housing in said positioned manner when said cover is connected to said housing, and closes said opposite opening of said housing.

3. A radial ball-and-socket joint in accordance with claim 2, wherein said damping element is flexible and is arranged between said cover and said ribs and applies an axial pretension to the bearing shell.

4. A radial ball-and-socket joint in accordance with claim 1, wherein said damping element is vulcanized or bonded to said cover.

5. A radial ball-and-socket joint in accordance with claim 4, wherein said damping element is a rubber ring inserted loosely between said cover and said bearing shell;

said slot extends completely through said bearing shell in an axial and radial direction of said shaft of said ball pivot.

6. A radial ball-and-socket joint in accordance with claim 5, wherein said damping element is one of round, rectangular or square in cross section.

7. A radial ball-and-socket joint in accordance with claim 4, wherein said bearing shell has a spherical bearing surface with a circumferential recess in an equatorial area.

8. A radial ball-and-socket joint accordance with claim 4, wherein said bearing shell has a spherical inner bearing surface with a plurality of recesses forming grease pockets.

9. A radial ball-and-socket joint comprising:

a housing having an outlet opening;

a bearing shell disposed in said housing, said bearing shell being accommodated in said housing, said bearing shell having edges defining an axially extending, continuous slot, said edges being circumferentially spaced from each other, a joint ball and ball pivot, said joint ball being rotatably and tiltably accommodated in said bearing shell, said ball pivot having a shaft, which projects through said outlet opening of said housing, said bearing shell enclosing said joint ball;

a cover closing said housing on a side of said housing opposite said outlet opening;

a damping element arranged between said cover and said bearing shell on an inner side of said cover facing said bearing shell, said cover having a geometry to bear on said damping element to maintain a cicumferential position of said bearing shell in said housing.

10. A radial ball-and-socket joint in accordance with claim 9, wherein said bearing shell has ribs arranged circumferentially on a side facing said cover.

11. A radical ball-and-socket joint in accordance with claim 9, wherein said damping element is flexible and is arranged between said cover and said ribs and applies an axial pretension to the bearing shell.

12. A radial ball-and-socket joint in accordance with claim 9, wherein said damping element is vulcanized or bonded to said cover.

13. A radial ball-and-socket joint in accordance with claim 9, wherein said damping element is a rubber ring inserted loosely between said cover and said bearing shell.

14. A radial ball-and-socket joint in accordance with claim 9, wherein said damping element is one of round, retangular or square in cross section.

15. A radial ball-and-socket joint in accordance with claim 9, wherein said bearing shell has a spherical bearing surface with a circumferential recess in an equatorial area.

16. A radial ball-and-socket joint in accordance with claim 9, wherein said bearing shell has a spherical inner bearing surface with a plurality of recesses forming grease pockets.

17. A radial ball-and-socket joint comprising:

a ball pivot including a joint ball and a shaft;

a one piece bearing shell enclosing said joint ball of said ball pivot, said bearing shell including edges defining a slot extending completely through said bearing shell in an axial and radial direction of said shaft of said ball pivot, said edges being spaced from each other in a circumferential direction of said shaft of said ball pivot, said joint ball being rotatably accommodated in said bearing shell;

a housing arranged around said bearing shell, said housing defining an outlet opening and an opposite opening, said shaft of said ball pivot extending through said outlet opening, a damping element arranged at said opposite opening of said housing;

a cover connected to said housing and closing said opposite opening of said housing, said cover, said damping element and said bearing shell interacting to fix said bearing shell relative to said housing in a predetermined circumferential position when said cover is connected to said housing, and closes said opposite opening of said housing.

18. A radial ball-and-socket joint in accordance with claim 17, wherein:

said bearing shell includes ribs arranged circumferentially on a side facing said cover, said ribs interlocking with a shape of said damper to fix said bearing shell to said housing in said predetermined position;

said cover having a shape to interlock with said shape of said damper to fix said bearing shell to said housing said predetermined position;

said cover compressing said damper to distort said damper into said shape to interlock said damper with said bearing shell and said cover.

19. A radial ball-and-socket joint in accordance with claim 17, where:

said bearing shell surrounds an equatorial portion of said joint ball.

20. A radial ball-and-socket joint in accordance with claim 17, wherein:

said damper is vulcanized to said cover.

* * * * *